United States Patent
Schmiegel (10) Patent No.: US 8,803,362 B2
(45) Date of Patent: Aug. 12, 2014

(54) STANDALONE UNIT OF A STANDALONE POWER GRID FOR COMMUNICATING ENERGY REQUESTS WITH ANOTHER STANDALONE UNIT

(75) Inventor: Armin U. Schmiegel, Hamburg (DE)

(73) Assignee: voltwerk electronics GmbH, Hamburg (DE)

(*) Notice: Subject to any disclaimer, the term of this patent is extended or adjusted under 35 U.S.C. 154(b) by 354 days.

(21) Appl. No.: 12/875,945

(22) Filed: Sep. 3, 2010

(65) Prior Publication Data
US 2011/0080044 A1   Apr. 7, 2011

(30) Foreign Application Priority Data
Sep. 4, 2009   (DE) .................. 10 2009 040 091

(51) Int. Cl.
*H02J 1/00* (2006.01)

(52) U.S. Cl.
USPC .............................................. 307/85

(58) Field of Classification Search
USPC .......... 307/43–87, 18–29, 150, 151; 700/291, 700/296, 297, 286
See application file for complete search history.

(56) References Cited

U.S. PATENT DOCUMENTS

| | | | |
|---|---|---|---|
| 2002/0036430 A1 | 3/2002 | Welches et al. | |
| 2004/0263116 A1* | 12/2004 | Doruk et al. | 320/107 |
| 2008/0039980 A1* | 2/2008 | Pollack et al. | 700/295 |
| 2009/0027932 A1* | 1/2009 | Haines et al. | 363/95 |
| 2010/0141046 A1* | 6/2010 | Paik | 307/126 |
| 2011/0095601 A1* | 4/2011 | Johansson | 307/9.1 |
| 2011/0213506 A1* | 9/2011 | Gamboa Tuesta et al. | 700/287 |

FOREIGN PATENT DOCUMENTS

EP    2 075 891 A1   7/2009

OTHER PUBLICATIONS

He, Mike M. et al.; "An Architecture for Local Energy Generation, Distribution, and Sharing"; 2008, IEEE Energy 2030, 6 pages.

* cited by examiner

*Primary Examiner* — Jared Fureman
*Assistant Examiner* — Duc M Pham
(74) *Attorney, Agent, or Firm* — Kilpatrick Townsend & Stockton LLP (57) ABSTRACT

The invention relates to a standalone unit for a standalone power grid, to a standalone power grid comprising a standalone unit and to a method for controlling a standalone power grid. In order to permit reduced recourse to an external power grid or public power grid, the standalone unit according to the invention comprises a power generation unit, in particular a photovoltaic unit, for generating power from renewable resources, an energy storage unit for storing energy, a load connection unit for connecting the standalone unit to a load unit for consuming energy, a grid unit, in particular an inverter unit, for connecting the standalone unit to a power grid, for drawing energy from the power grid and for feeding energy into the power grid, and an interface unit for communicating an energy withdrawal request and/or an energy storage request with a second standalone unit.

14 Claims, 7 Drawing Sheets

STANDALONE UNIT OF A STANDALONE POWER GRID FOR COMMUNICATING ENERGY REQUESTS WITH ANOTHER STANDALONE UNIT

CROSS-REFERENCE TO RELATED APPLICATIONS

This application claims priority to German Patent Application No. 10 2009 040 091.5, filed Sep. 4, 2009, the disclosure of which is incorporated herein by reference.

The invention relates to a standalone unit for a standalone power grid, to a standalone power grid comprising a standalone unit and to a method for controlling a standalone power grid.

Standalone units, for example ones that supply electrical power to a household, as consumer unit, are well known. Such a standalone unit has a power generation unit, such as a photovoltaic system, which generates energy from renewable resources, such as solar insolation, and which supplies that energy to the household. When the photovoltaic system generates a substantial amount of energy, for example when weather conditions are good, the household is supplied with sufficient electrical power. When the photovoltaic system generates less energy than the household consumes, for example at night or when weather conditions are poor, the household needs to cover its energy requirements from a public or external power grid. For this purpose, the standalone unit has a grid unit by means of which the standalone unit may be connected to the power grid in order to draw this energy. This connection also permits the standalone unit to release energy that it generates to the power grid when the photovoltaic system generates more energy than is consumed by the household.

The disadvantage of such a standalone unit is that it is complicated to exchange energy between the standalone unit and the power grid. More specifically, each flow of energy between the standalone unit and the power grid must be accounted for, which involves complicated calculation methods, inter alia.

A distributed energy storage system is known from US 2004/0263116 A1. Said energy storage system comprises electrical loads connected to an energy storage unit via the public power grid and energy generators that are likewise connected to the public power grid via a storage unit. The disadvantage of this system is that the public power grid must always be used in order to transfer energy from the energy generators to the electrical loads. The consequence is that, at peak times for power generation or power consumption, especially towards the end of such peak times, when the energy storage units near the electrical loads are depleted or the energy storage units near the energy generators are full, grid overload may occur, or the public grid needs to be dimensioned to match such peak loads. This results in instabilities in the public grid and unfavorable dimensioning requirements for the public grid. One object of the present invention is to overcome these disadvantages.

A local area grid for distributed power generation by means of fuel cells is known from US 2002/0036430 A1. Said system addresses the problems of coupling heat generation and electric power generation in fuel cells, and the associated overproduction of electrical energy in local households that have a fuel cell unit for power supply. The document proposes interconnecting a plurality of households by means of a grid and local power control logic in order to permit the transfer of electrical energy into the power grid from any household that is producing a surplus of energy. US 2002/0036430 A1 thus addresses a specific problem in the field of fuel cell technology and proposes a solution to that problem. The disadvantage of this solution is that, although it can be applied appropriately and economically in a specific manner to the case of overproduction of electrical energy for a standalone household, the disadvantages associated with fuel cells arise in the known manner, especially when the household requires no heat generation or only a little, and either the surplus heat produced in the course of electric power generation must be dissipated without being used, or fuel cell operation must be cut back partially or totally and electrical energy drawn from the grid. This, too, has the consequence that, with the proposed system, substantial peak loads, especially peak loads due to seasonal factors or the time of day, must be compensated by power transfer from the public grid, thus resulting in the grid instability and grid dimensioning disadvantages described above.

Finally, in the article entitled "An Architecture for Local Energy Generation, Distribution and Sharing", MIKE et al. IEEE Energy 2030, Atlanta, Ga., USA, 17-18 Nov. 2008, a power grid system is proposed that provides an intelligent power switch that is locally integrated between an energy generator, an energy storage unit and a load. The intelligent power switch is connected to a power grid via a power and communication interface. Although the disclosed system theoretically makes it possible to connect individual energy generators intelligently to local energy consumers and energy storage units, one problem that arises here is that the individual units thus defined are limited in their consumption, generation and storage capacities and that a grid designed for high transmission capacities is necessary to provide reliable power supply when uniform conditions persist for a long time. Compared to this prior art system, the object of the present invention is to provide greater stability in a power supply system while at the same time allowing advantageous dimensioning of the power supply grid.

According to the invention, this object is achieved by means of a standalone unit for a standalone grid system comprising a power generation unit, in particular a photovoltaic unit, for generating power from renewable resources, an energy storage unit for storing energy, a load connection unit for connecting the standalone unit to a consumer unit for consumption of energy, a grid unit, in particular an inverter unit, for connecting the standalone unit to a power grid, for drawing energy from the power grid and for feeding energy into the power grid, and an interface unit for communicating an energy withdrawal request and/or an energy storage request with a second standalone unit.

A power generation unit is understood in this context to be a power generation unit that is dependent on external environmental influences, in other words one whose energy yield cannot be controlled directly, but can at best be choked, like a photovoltaic system, for example, whose energy yield is directly related to the amount of incident sunlight. Other power generation units, such as fuel-fired generators, fuel cells or other power station technologies, are not affected by the problems addressed by the invention. The invention is based on the concept of a standalone power grid, which has a plurality of standalone units, communicating the energy requirement and/or energy surplus between the standalone units and being able to arrange an appropriate energy flow so that recourse to the (public) power grid can be avoided. One advantage of the inventive interface unit of a standalone unit according to the invention is that these requests to store and/or draw energy are exchanged between the neighboring installations known to the standalone unit, that is, with second, third, etc. standalone units that are in communication with the standalone unit—without having to make use of a central control unit. According to the invention, it is therefore possible to do without a central control unit within the standalone power grid.

Another advantage is that communication between the standalone units means faster handling of the respective requests. Instead of a central control unit sending a request to a plurality of standalone units and having to administer the respective responses until one standalone unit has been selected to handle the request, the energy withdrawal request or energy storage request is sent or forwarded, according to the invention, from one standalone unit to the next standalone unit, which then decides autonomously whether it can handle the request or not. According to the invention, the energy withdrawal request or energy storage can therefore be handled faster and more simply.

A standalone unit is understood here to be an essentially autarchic assembly comprising a power generation unit and energy consumers that are connected to each other directly within the assembly, as for example in a detached house or apartment house with its own photovoltaic system. Although, according to the invention, this standalone unit is connected to the public grid for infeeding and withdrawing energy, energy can also and preferably be transmitted directly via a transmission line provided within the standalone unit from the power generation unit to a consumer unit, i.e., to a load within the standalone unit that is connected to the consumer connection unit, or to an energy storage unit within the standalone unit. This transmission of power does not require any use of the public grid, so it is possible to effectively prevent peak loads from occurring in the public grid connected to the interface unit.

It is preferred when the interface unit is configured to receive from the second standalone unit the energy withdrawal request to draw energy from the standalone unit, to send to the second standalone unit the energy withdrawal request to draw energy from the second standalone unit, to receive from the second standalone unit the energy storage request to store energy in the standalone unit, and/or to send to the second standalone unit the energy storage request to store energy in the second standalone unit. What this advantageously achieves is that the standalone unit and the second standalone unit are able to balance any energy requirement and any energy surplus amongst each other. Depending on whether too much or too little energy is available in the standalone unit and in the second standalone unit, it is possible for information to be sent accordingly to the respective other standalone unit which is able to balance the energy requirement and the energy surplus. According to the invention, a very simple solution is thus achieved for a situation in which a standalone unit has an energy surplus or an energy requirement, without complicated and time-consuming communication via a central control unit being required. By virtue of this kind of communication and power transmission between a plurality of standalone units, it is possible, according to the invention, for a standalone unit which produces a surplus of energy to transmit this energy to an adjacent standalone unit or to a standalone unit in a local network comprising a plurality of spatially adjacent standalone units (for example in a residential district covering an area of one square kilometer), and for said energy to be stored there in the energy storage unit. This significantly increases the flexibility of energy storage, since it also possible, unlike in the prior art, to transfer energy into the grid and to other standalone units even when that energy is not consumed by other consumers in the public grid. In this way, the stability of the grid can be significantly increased. By means of networked standalone units, grid infeed can also be optimized and the load on the public grid, in terms of transmission capacities over long distances, can also be reduced. Finally, energy trading is facilitated and fostered in that the invention provides the technical opportunity to invest in energy storage units as well, and to provide their storage capacities to other users in return for a consideration.

The invention is based on the realization that the public power grid can be relieved of load and stabilized, in particular by reducing the distances over which power is transmitted, by interconnecting adjacent storage units, generators and consumers intelligently for mutual exchange of energy. It should therefore be understood, by the same token, that energy can also be transmitted from the storage unit of one standalone unit to the consumer unit of a different standalone unit by power transmission and communication between the two standalone units, and that the standalone units are adapted accordingly.

The interface unit is preferably configured to forward the energy withdrawal request and/or the energy storage request to the second standalone unit. What this advantageously achieves is that, even in the event that two standalone units are unable to mutually assist with energy requirement, energy storage capacity or energy surplus, a third standalone unit of the standalone power grid can be brought in to balance the energy requirement and/or energy surplus. In this way, communication in the standalone power grid according to the invention is further simplified without a central control unit.

The standalone unit is also preferably configured to receive the energy withdrawal request and/or the energy storage request from an administrative unit of the standalone power grid. In one preferred embodiment, the administrative unit is an interface between standalone power grids. What this advantageously achieves is that one (or more) energy storage requests and an energy withdrawal request are pooled in the administrative unit, wherein the administrative unit sends or forwards the request to one, preferably exactly one standalone unit of the standalone power grid. This standalone unit then decides whether it can satisfy the request and forwards the request, if necessary, to one or several standalone units as described above. The administrative unit thus forms, in a preferred manner, a communication link in the communication chain of standalone units.

The energy storage unit is preferably configured to store energy in response to an energy storage request. The energy storage unit is preferably configured to store the energy that was generated in the standalone unit that sent the energy storage request. The invention provides the advantage that the standalone unit can have virtual recourse not only to its own energy storage unit, but also to energy storage units of the second, third, etc. standalone units, in order to store any surplus of energy and preferably to not supply it to the (public) power grid. Another advantage is that balancing between the standalone power grid and the public power grid is simplified, in that any energy surplus or energy requirement is largely balanced within the standalone power grid.

The standalone unit is preferably configured to release energy, in particular from the energy storage unit and/or from the power generation unit, in response to an energy withdrawal request submitted to the standalone power grid. What this advantageously achieves is that the energy storage unit and the power generation unit of the standalone unit are made virtually available to the second, third, etc. standalone unit within the standalone power grid. According to the invention, the standalone power grid is therefore largely independent of the public power grid and autonomously balances any energy surplus and any energy requirement among the standalone units.

The standalone unit is preferably configured to receive from the standalone power grid an identification information that identifies the second standalone unit, and the interface unit is preferably configured to communicate with the identified second standalone unit. In this embodiment with direct configuration, the standalone unit is notified by the standalone power grid and/or the administrative unit about which second, third, etc. standalone unit it should communicate with, i.e. which it should virtualize. According to the invention, it is possible in this way to define a selection of standalone units within the standalone power grid as a virtual power plant. This is particularly advantageous when a specific set of standalone units has such an energy requirement and surplus that the individual standalone units of this virtual are especially suitable for reciprocal balancing. A virtual power plant is preferably defined on the basis of a reference period, daily, weekly, monthly or annual data, weather data, etc.

The standalone unit is preferably configured to send an identification information request to the standalone power grid. In this preferred embodiment, the standalone unit initiates an active search in the standalone power grid or in a predefined standalone subgrid: the standalone unit sends an identification information request signal to at least one other standalone unit in order to establish a communication link with the respective standalone unit and to permit visualization. It is further preferred that the standalone unit sends the identification information request to the administrative unit in order to receive the identification information from the latter. Such a process is advantageous, particularly when a new standalone unit is added to an existing standalone power grid, and which gives notification of its presence within the standalone power grid and of its intention to virtualize. Exchanging identification by means of a request or query can also serve to document services relating to power transmission, such as consumption of energy in a standalone unit from an energy generator of a different standalone unit, or storage of energy from one standalone unit in a different standalone unit, and to supply this information for billing purposes.

Another aspect of the invention relates to a standalone power grid comprising a standalone unit according to the invention and an administrative unit. The standalone power grid preferably has an additional, second standalone unit having the features of the standalone unit according to the invention.

Another aspect of the invention relates to a method for controlling a standalone power grid according to the invention, comprising the step of communicating the energy withdrawal request and/or energy storage request between the standalone unit and the second standalone unit. The method according to the invention preferably comprises the step of sending an energy withdrawal request and/or energy storage request from the administrative unit to the standalone unit. According to the invention, the communication step preferably comprises one or more of the following steps: receiving the energy withdrawal request from the second standalone unit to the standalone unit to draw energy from the standalone unit, sending the energy withdrawal request from the standalone unit to the second standalone unit to draw energy from the second standalone unit, receiving the energy storage request from the second standalone unit to the standalone unit to store energy in the standalone unit, sending the energy storage request from the standalone unit to the second standalone unit to store energy in the second standalone unit, and/or forwarding the energy withdrawal request and/or the energy storage request from the standalone unit to the second standalone unit. The advantages and effects described in the foregoing with reference to the standalone unit according to the invention apply equally.

In one preferred embodiment, the method according to the invention comprises the additional step of selecting the standalone unit, to which the administrative unit sends the energy withdrawal request and/or energy storage request, according to a prioritization list representing a prioritized order of the standalone unit and the second standalone unit, and/or according to a prediction list representing a predicted order of the standalone unit and the second standalone unit. According to the invention, it is possible in this way to define a specific sequence of standalone units within the standalone power grid, within which the requests are to be sent or forwarded. The standalone unit is preferably before the second standalone unit on the prioritization list, in particular when the standalone unit is suitable for generating energy more cheaply, reliably and efficiently than is the second standalone unit. The standalone unit is preferably before the second standalone unit on the prediction list, particularly when it is known, on the basis of a reference period or data relating to the weather, the time of day, the date, week or season that the standalone unit is more frequently suitable than the second standalone unit to balance an energy surplus or an energy requirement. Forwarding requests along a communication chain of standalone units can thus be reduced, and any energy requirement or energy surplus can be satisfied faster. This development of the invention allows power transmission and related communication to be effected between selected standalone units in a specific sequence. For example, energy can preferably be exchanged between adjacent standalone units, with a remote standalone unit, from which energy is taken or to which energy is supplied, being selected only in the event that an adjacent standalone unit does not have a sufficient power surplus or stored energy to provide, or sufficient energy requirement or storage capacity to receive energy. By minimizing the transmission distances, this prioritization or prediction list thus achieves a significant load reduction and stabilization of the public grid.

In addition to this advantage, however, a standalone unit may also prioritize or predict in such a way that standalone units that typically behave acyclically are provided for the preferred exchange of energy. In this way, a standalone unit with a photovoltaic system may be prioritized over a standalone unit with a wind turbine, for example, by applying the meteorological assumption that sunny days tend to have less wind and windy days tend to have less sun.

The method according to the invention preferably comprises the additional step of selecting the second standalone unit, with which the standalone unit communicates, according to a prioritization list representing a prioritized order of the second standalone unit and a third standalone unit, and/or according to a prediction list representing a predicted order of the second standalone unit and a third standalone unit. The advantages of a prioritization list and/or prediction list as described above apply analogously: with the aid of empirical values, weather data or other information representing the power production and power consumption by an individual standalone unit within the standalone power grid according to the invention, and with corresponding prioritization and prediction lists, a situation is advantageously achieved in which the amount of communication between individual standalone units can be reduced by sending or forwarding the request to a specific destination.

It is particularly preferred, with regard to the prioritization list, that the prioritized order for the energy withdrawal request be generated autonomously by the standalone power grid. Prioritization is preferably carried out on the basis of data received by fetching parameters and status characteristics of a standalone unit (e.g. current power production, current consumption by the consumer unit) or also of several standalone units, which may be grouped together as a subgrid. It is also preferred that the standalone unit (and analogously the second, third, etc. standalone unit) be configured to define which energy reserves it is prepared to release to the standalone power grid (e.g. a maximum of 35% of the surplus battery capacity or photovoltaic energy currently being generated, when the battery charge level is greater than 50%). The predefined amounts are preferably dependent on time. In one correspondingly preferred embodiment, the standalone unit is configured to be operated within the standalone power grid in a summer/winter mode or in a morning/midday/evening mode.

The mechanisms described above for producing the prioritization list is preferably applied analogously to the prediction list.

By virtualizing the standalone units within a standalone power grid, the invention makes it possible to achieve a particularly high level of efficiency in the production and consumption of energy. According to the invention, this is made possible by small intelligent standalone units, which for their part receive information during installation or configuration for virtualizing themselves with other small systems within the standalone power grid.

Embodiments of the invention shall now be described with reference to Figures, in which.

Figure 1:
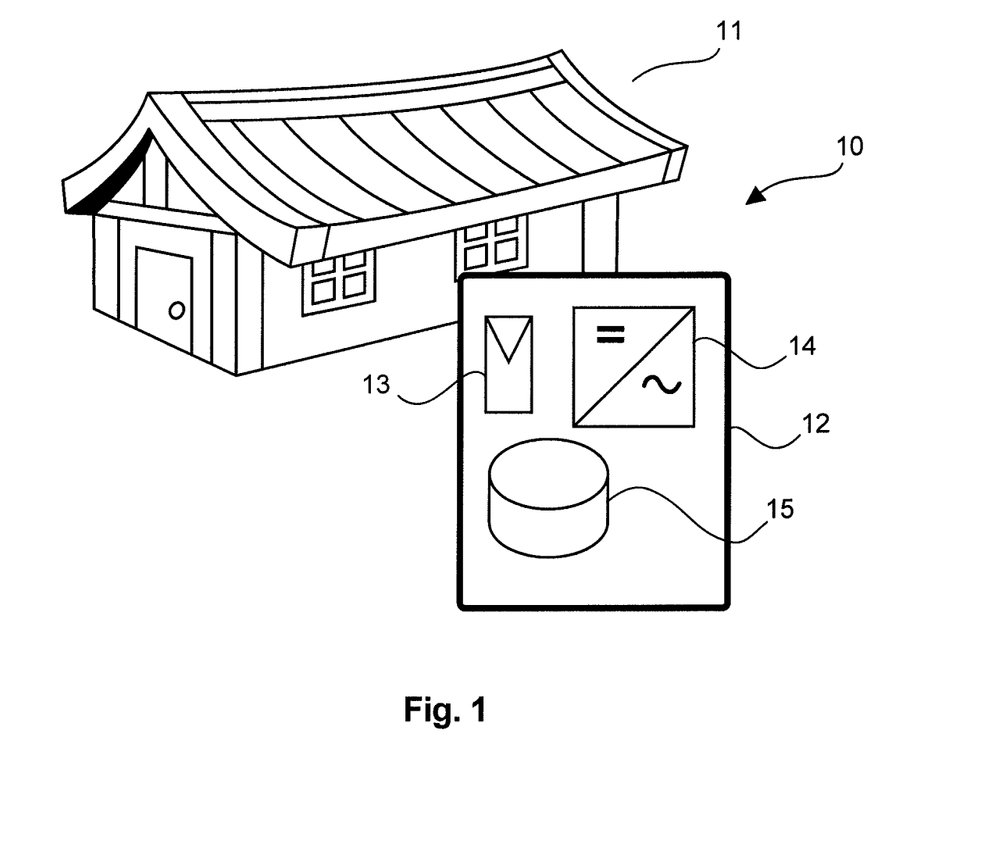
FIG. 1 shows a standalone unit for a standalone power grid.

FIG. 1 shows a standalone unit comprising a consumer unit 11 and a standalone power plant 12. Standalone power plant 12 has a power generation unit 13, a grid unit, in particular an inverter, 14 and an energy storage unit 15. The power generation unit 13 is preferably a photovoltaic system, although the invention is not limited to the generation of solar power, and can generate power equally well from wind energy, biogas or other renewable resources.

Figure 2:
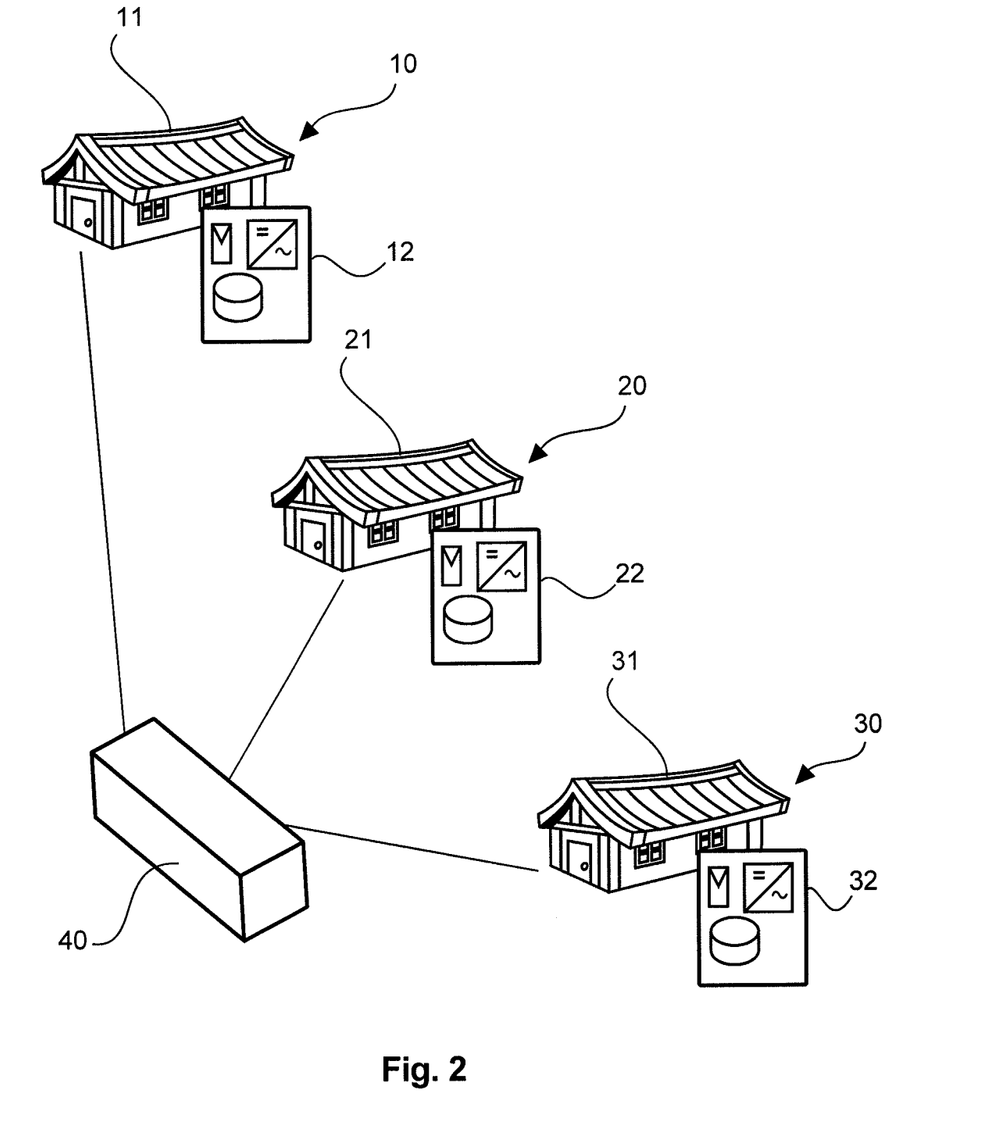
FIG. 2 shows a standalone power grid comprising standalone units and a central control unit.

FIG. 2 shows a standalone power grid comprising a plurality of standalone units, as shown in FIG. 1, and a central control unit 40. Each of the additional standalone units 20, 30 comprises components identical to those of standalone unit 10. Control unit 40 generates and communicates energy withdrawal requests and energy storage requests with each individual standalone unit. In the standalone power grid shown in FIG. 2, no communication occurs between standalone units 10, 20, 30. In order to balance an energy requirement or an energy surplus in standalone unit 10, it is necessary that standalone unit 10 send a request to that effect to the central control unit 40, which forwards this request to standalone units 20, 30. If at least one of standalone units 20, 30 is able to meet the energy requirement or take the energy surplus of standalone unit 10, it sends a signal to that effect to the central control unit 40, which then coordinates the flow of energy between standalone units 10, 20, 30, accordingly. Communication between the central control unit 40 and standalone units 10, 20, 30 is complicated and cumbersome on account of the branched communication from and to the central control unit 40.

Figure 3:
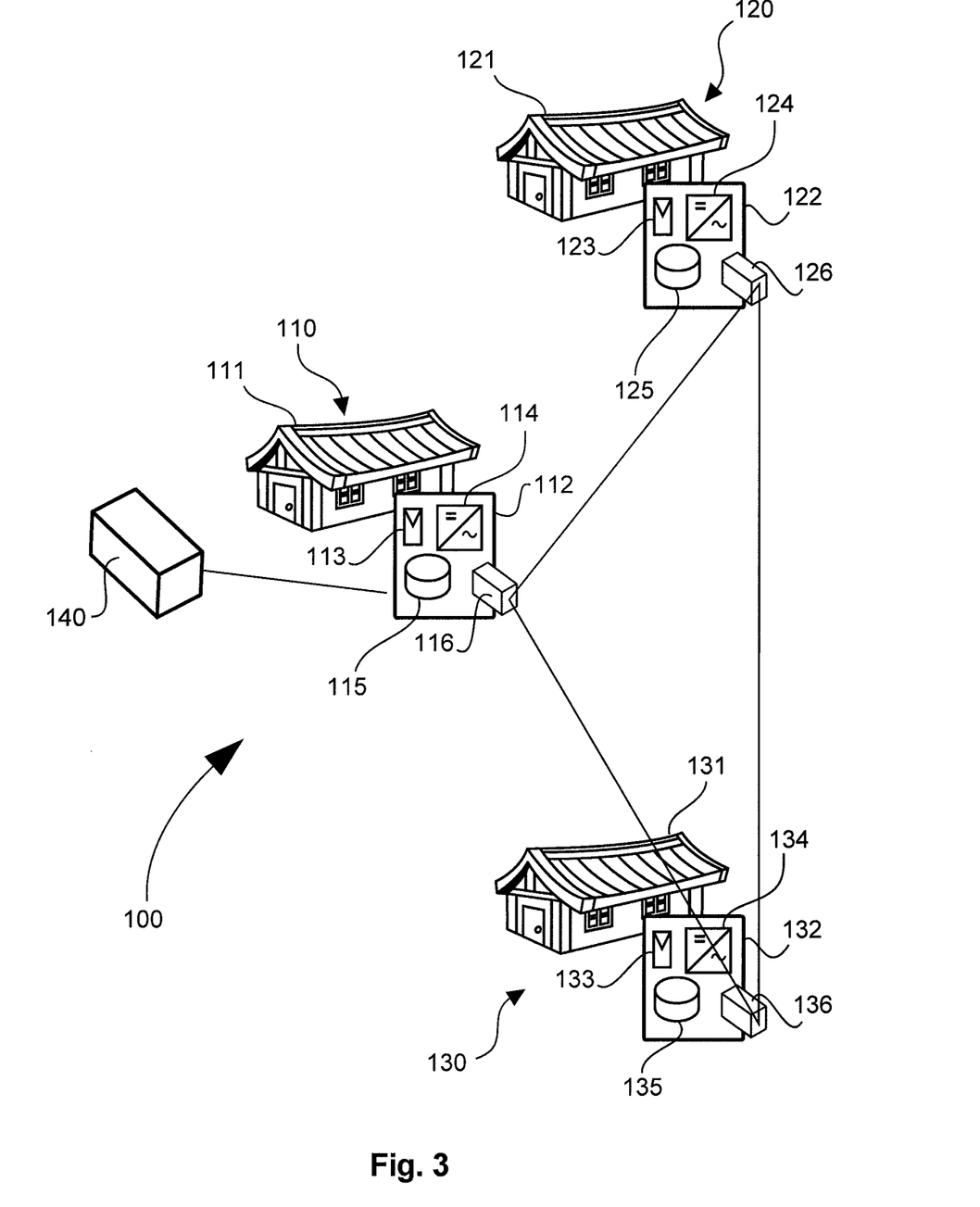
FIG. 3 shows another standalone power grid comprising other standalone units.

According to the invention, communication and hence balancing of the energy surplus and energy requirement is performed by a standalone power grid as shown by way of example in FIG. 3. FIG. 3 shows a (first) standalone unit 110, a second standalone unit 120 and a third standalone unit 130. Standalone unit 110 has a consumer unit 111 which consumes the energy which is generated, stored and/or withdrawn from the power grid. Standalone unit 110 also has a standalone power plant 112. Standalone power plant 112 has photovoltaic system 113, for example. However, power generation unit 113 may be any other type of system that is capable of generating energy from renewable resources. Standalone power plant 112 also comprises an inverter 114 and an energy storage unit 115. According to the invention, standalone unit 110 has an interface unit 116 which is configured to communicate energy withdrawal requests and/or energy storage requests with other standalone units, for example the standalone unit 120, 130 according to the invention. However, it is also possible that the inventive standalone unit 110 communicates with conventional standalone units.

In the embodiment shown in FIG. 3, standalone units 120 and 130 are configured with units analogous to those in standalone unit 110. Standalone unit 120 comprises a consumer unit 121, a standalone power plant 122, a power generation unit 123, a grid unit 124, an energy storage unit 125 and an interface unit 126. Standalone unit 130 comprises a consumer unit 131, a standalone power plant 132, a power generation unit 133, a grid unit 134, an energy storage unit 135 and an interface unit 136.

The standalone power grid according to the invention and shown in FIG. 3 also includes an administrative unit 140. Administrative unit 140 preferably communicates with the first standalone unit 110. However, it is also possible for administrative unit 140 to communicate in the same way with at least one of standalone units 120 and 130.

Operation of the standalone power grid 100 according to the invention shall now be described.

Standalone unit 110 (and similarly standalone units 120, 130) generates energy from sunlight by means of the photovoltaic system 113. In the case of direct sunlight under very good weather conditions, or during summer in the earth's northern hemisphere, photovoltaic system 113 generates energy very efficiently. If more energy is generated in standalone unit 110 by photovoltaic system 113 than is consumed by consumer unit 111 (e.g. a household or a small enterprise), an energy surplus is available. This energy surplus may be transferred to the energy storage unit 115, for example, in order to charge a battery member of storage unit 115. The energy surplus may also be fed via inverter 114 to a power grid, for example to a public power grid. Inverter 114 is preferably included in the consumer connection unit of standalone unit 110, via which consumer unit 111 is connected to the standalone unit. Thus, energy which has been generated may be stored in storage unit 115, fed to the energy grid via inverter 114 and consumed by the consumer unit via inverter 114 and the consumer connection unit.

If the energy generated in photovoltaic system 113 now exceeds the energy consumption of consumer unit 114, the energy surplus is initially channeled to storage unit 115 in order to charge the latter (almost) completely. Storage unit 115 serves as an emergency reserve, for example during bad weather, power failures, etc., for covering the energy requirement of consumer unit 111. If, after supplying generated energy to consumer unit 111 and charging storage member 115, there is still an energy surplus, this can either be fed to the (public) power grid and accounted for accordingly, or—in accordance with the invention—may be released to one (or more) standalone unit(s) 120, 130 of the standalone power grid. Such release may be carried out in order to cover the energy requirement of another standalone unit 120, 130, or also to charge the energy storage units 125, 135 of the other standalone units 120, 130. Standalone unit 110 is configured according to the invention in such a way that it have recourse to virtual consumer units 121, 131 and virtual storage units 125, 135 and can release energy to the latter. In this way, an energy requirement in standalone units 120, 130 can be covered in accordance with the invention without having to make use of the public power grid, which provides energy more expensively, more inefficiently and in a manner that is environmentally dubious.

An energy requirement in standalone unit 110 may arise, for example, when photovoltaic system 113 generates less energy than consumer unit 111 consumes. Such a situation may arise, for example, when photovoltaic system 113 is operating less efficiently due to poor weather conditions, during winter in the earth's northern hemisphere, or at night. If photovoltaic unit 113 supplies too little energy to meet the energy consumption of consumer unit 111, standalone unit 110 will initially make use of energy storage unit 115 in order to extract this energy and supply it to consumer unit 111. If the energy stored in storage unit 115 is not sufficient to cover the energy requirement of consumer unit 111, standalone unit 110 would have to make use of energy from the public power grid, which is produced more expensively, more inefficiently and in a manner than is environmentally dubious. According to the invention, recourse to the public power grid may be prevented by standalone unit 110 being able to cover its energy requirement with its virtual power generation units 123, 133 and/or its virtual storage units 125, 135. According to the invention, standalone unit 110 sends an energy withdrawal request by means of interface unit 116 to at least one of the other standalone units 120, 130. If one of the other standalone units 120, 130 has an energy surplus, this respective other standalone unit 120, 130 responds to the energy withdrawal request of standalone unit 110 and allows standalone unit 110 to draw energy from the respective energy storage unit 125, 135 and/or photovoltaic system 123, 133.

According to the invention, standalone units 110, 120, 130 can exchange energy amongst each other by means of the energy withdrawal requests and energy storage requests communicated by means of interface units 116, 126, 136 and can largely avoid recourse to the public power grid.

Administrative unit 140 is configured to send an energy storage and/or energy withdrawal request to one of standalone units 110, 120, 130. In a power grid comprising a particularly large number of standalone units, administrative unit 140 may also be in communication with a plurality of standalone units 110, 120, 130. According to the invention, at least one standalone unit 110 of the standalone power grid is configured to send or forward a request to another standalone unit 120, 130 in order to shorten communication by visualization. Administrative unit 140 can then serve, for example, as an interface between standalone power grids or between a standalone power grid and the public power grid.

According to the invention, many small energy production and energy consumption systems (standalone units) may be grouped together to form a large virtual power plant system. In order to draw energy from the virtual power plant according to the invention or to feed energy to it, it suffices according to the invention to send or receive a request to or from one of the standalone units within the standalone power grid according to the invention. In this way, communication with the standalone power grid is made substantially easier and more efficient.

According to the invention, communication between standalone units 110, 120, 130 may be established in the form of direct configuration, with each standalone unit 110 being informed by the standalone power grid, e.g. by administrative unit 140, which standalone units 120, 130 it shall virtualize with. It is also possible for standalone unit 110 to organize an active search in the standalone power grid or in a standalone subgrid, with standalone unit 110 sending a circulating control signal within the standalone power grid in order to identify other standalone units 120, 130. It is also preferred that standalone unit 110 organizes an active search, for example on the Internet or via a radio communications network, in order to receive identification information specifying which standalone units 120, 130 it should connect to.

Although a standalone power grid according to the invention and comprising three standalone units is described in the foregoing, it is within the meaning of the invention that the standalone power grid may contain any number of standalone units.

Figure 4:
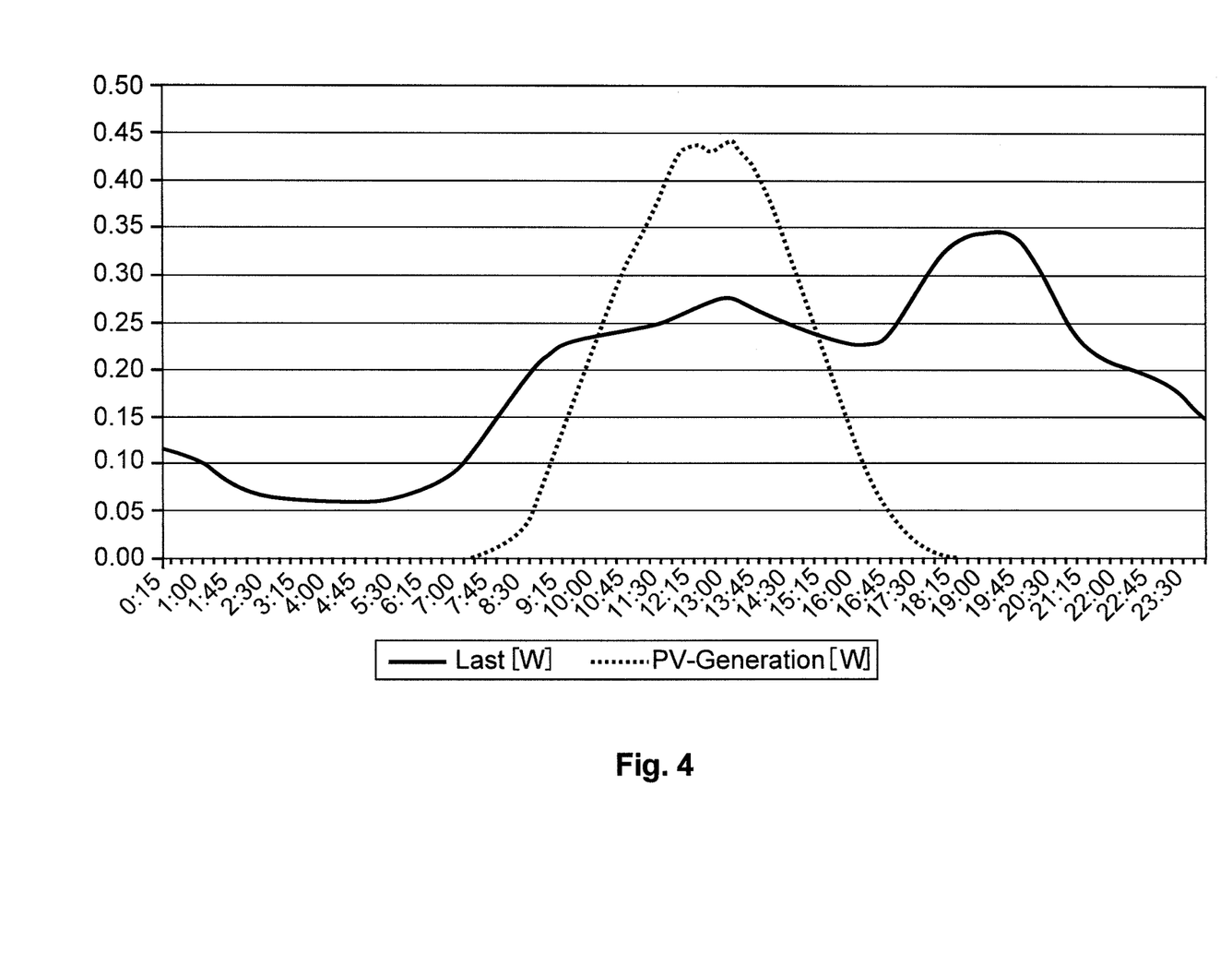
FIG. 4 shows mean power production and consumption.

The grid feed and consumption curves of a typical household are not parallel (FIG. 4). If the aim is to maximize own consumption, it is necessary either to change the terms and conditions of consumption or to use an appropriate storage medium. Another aspect, in Germany, is that the national grid is a three-phase grid with many terminal devices operated with three-phase current, whereas grid feed by consumer power plants is mainly done using single-phase string inverters.

FIG. 4 shows mean photovoltaic production of electricity and the mean load of a four-person household. The surplus photovoltaic output around midday can be clearly seen.

In order to optimize own consumption, one approach according to the invention involves no longer trying to feed produced photovoltaic energy directly and completely into the grid, but always to feed only that exact amount of photovoltaic electricity into the grid that is currently being consumed, and to store any surplus photovoltaic energy in intermediate storage.

In order to technically realize an effective solution using storage, it is necessary to identify the requirements to be met by such a system. These requirements include the following:
  Guaranteed battery life of 20 years
  Low life-cycle costs
  High cycle strength of the battery over its service life
  High total efficiency of approx. 95%, including the battery
  Small size, similar to a commercially available refrigerator
  No operating risks
  High level of reliability over the entire service life
  5 kWp maximum output
  5 kWh-8 kWh battery capacity
  Maximum installation time: four hours.

These requirements are met by high-efficiency lithium-ion batteries, for example. The size of the storage means to be used is defined on the basis of various parameters, such as size of the photovoltaic system, level of own consumption, user's safety needs, cost-effectiveness, etc.

Figure 5:
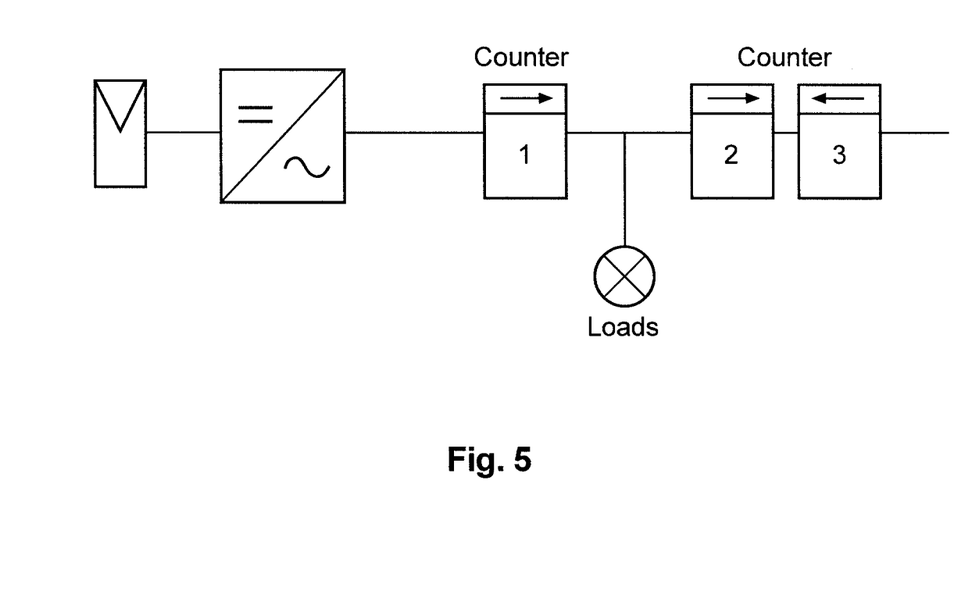
FIG. 5 shows a metering concept.

FIG. 5 shows a metering concept for determining own consumption of the energy generated. Meters 2 and 3 may be integrated in a single device.

The standalone grid according to the invention is able to provide the currently consumed amount of electricity simultaneously as required. The energy is supplied either directly from the photovoltaic system, from the storage unit or from a combination of both sources. Only when insufficient energy can be supplied from these sources is use made of grid power in order to cover short-term increases in requirements, for example. If the grid is not available due to failure, the system is able to store generated electricity and/or, as a backup, to supply power from the two sources as required, up to a defined amount.

Figure 6:
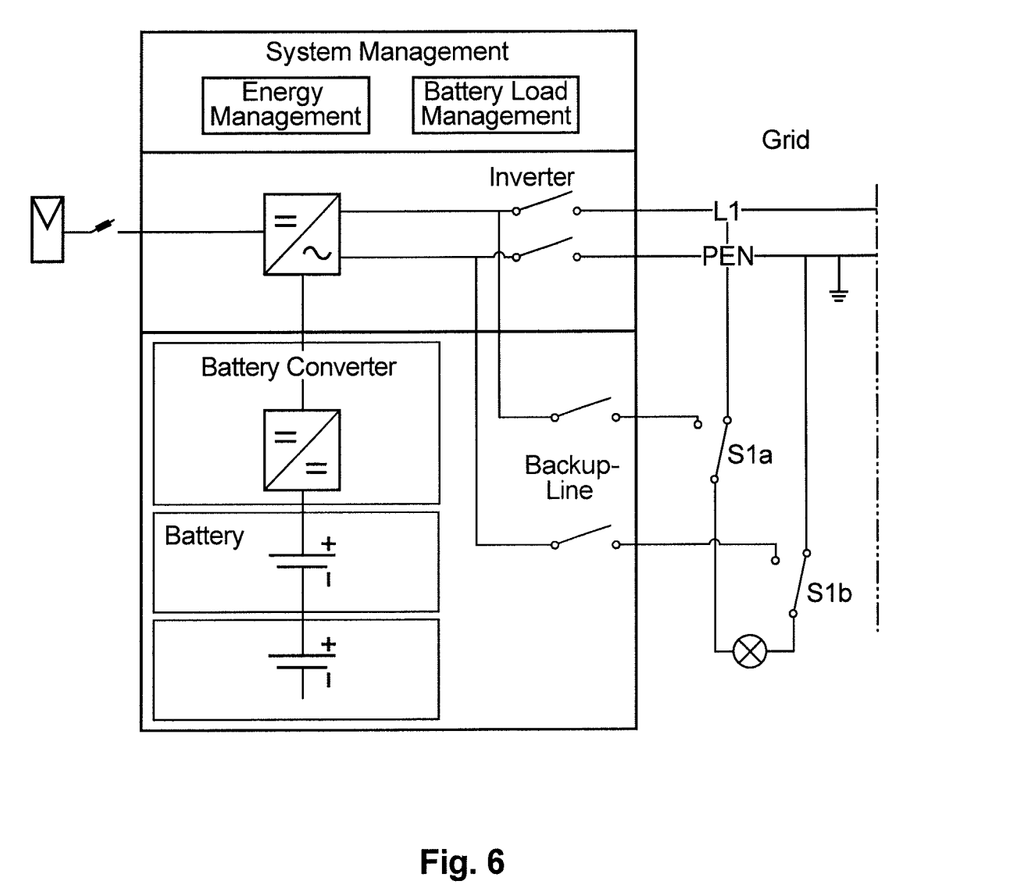
FIG. 6 shows a circuit of a standalone unit according to the invention.

FIG. 6 illustrates an embodiment according to the invention. The inverter, battery charger and battery module are integrated in a single device. In addition, a backup line is provided which can supply to loads up to a defined amount, as required, in the event of a power failure.

FIG. 6 shows a schematic view of a standalone grid according to the invention, for optimizing own consumption with the support of photovoltaic power. The standalone grid integrates the inverter, battery module and battery charger in a single device. In addition to the normal connection for grid feed, an additional connection for emergency power supply is provided. Switches S1*a* and S1*b* are used to connect and disconnect loads to the emergency power supply and can be operated by an energy management system.

The standalone unit according to the invention also includes an intelligent system management system which regulates and monitors the flows of energy and the operation of the components. The energy management system does this by measuring the current load on all three phases in order to determine the level of power to be provided by the inverter.

Parallel to this, the battery converter, which is a charge controller with a very high efficiency factor, stores any surplus photovoltaic electricity in the battery, or draws from the battery the difference between photovoltaic electricity and the amount of power to be supplied. The standalone unit compensates the highly dynamic fluctuations in power output that are characteristic of photovoltaic electricity and supports the inverter in providing the exact amount of power.

Figure 7:
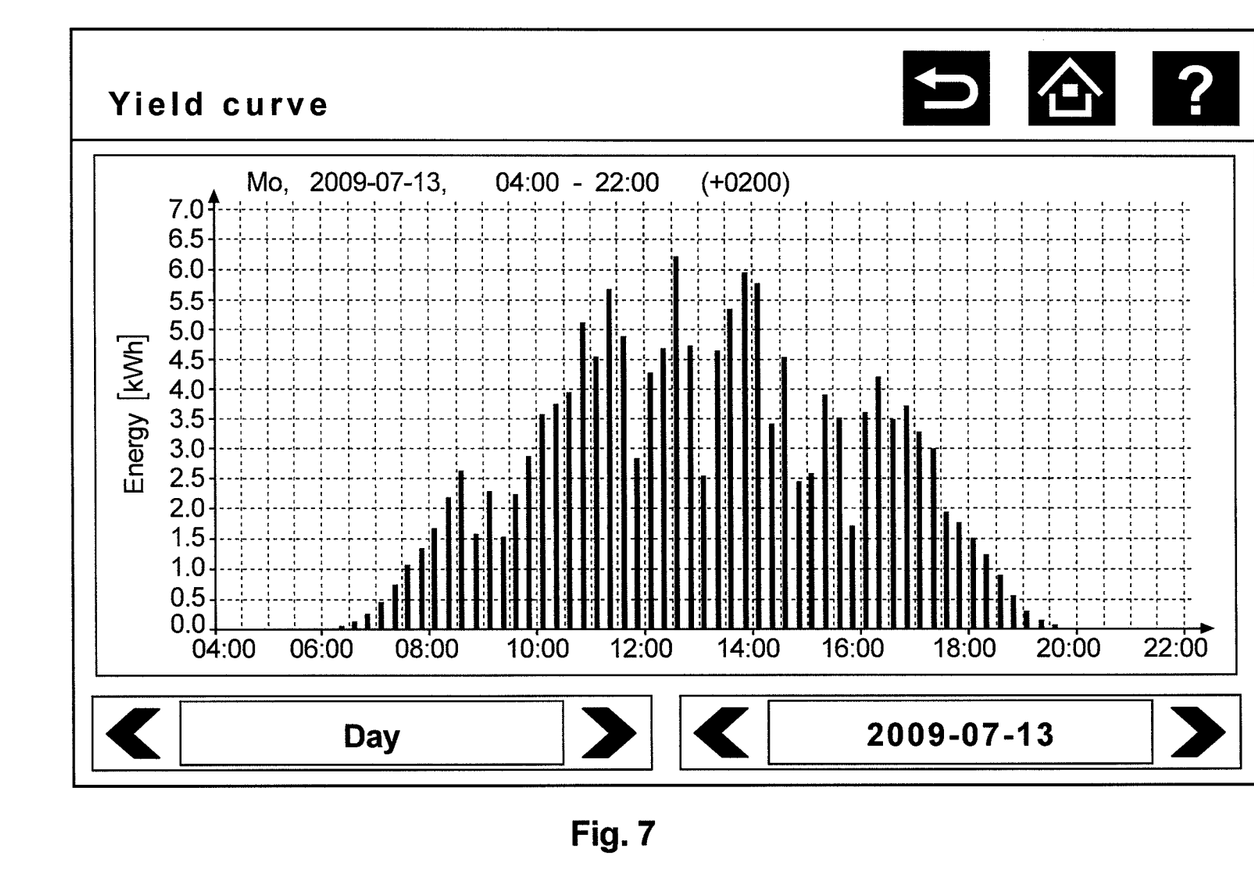
FIG. 7 shows a display unit of a standalone unit.

The system is equipped with a display for showing the user and the fitter key information about the electricity being produced, stored and internally consumed (FIG. 7). In this way, the system permits a high level of transparency with regard to the performance of the proprietary plant and provides the fitter with important details about system performance and supports him when performing any maintenance work that may be needed.

FIG. 7 shows system performance information as provided by the display.

The present invention incorporates many solutions that provide the user of the standalone unit with totally new ways of managing energy intelligently. The system is also built according to the construction kit principle, which means that it can be installed easily by a specialized fitter. Existing photovoltaic systems can also be retrofitted without difficulty.

The invention claimed is:

1. A standalone unit for a standalone power grid, comprising:
    a photovoltaic unit for generating power from renewable resources,
    an energy storage unit for storing energy,
    a consumer connection unit for connecting the standalone unit to a consumer unit for the consumption of energy,
    a grid unit, including an inverter unit, for connecting the standalone unit to a power grid, for drawing energy from the power grid and for feeding energy into the power grid, and
    an interface unit for communicating an energy withdrawal request or an energy storage request with a second standalone unit, which is adapted to send to the second standalone unit the energy storage request to store energy in the second standalone unit or an energy withdrawal request to draw energy from the second standalone unit,
    wherein energy withdrawal requests and energy storage requests are sent using direct communications from the standalone unit to only one other adjacent standalone unit in the standalone power grid without communicating through a central control unit, and wherein the other standalone unit is adapted to decide autonomously whether to handle the requests or to forward the requests to a next adjacent unit, wherein a specific sequence of standalone units is defined within the standalone power grid for energy balancing among adjacent standalone units.

2. The standalone unit of claim 1, wherein the interface unit is further configured:
    to receive from the second standalone unit the energy withdrawal request to draw energy from the standalone unit, or
    to receive from the second standalone unit the energy storage request to store energy in the standalone unit.

3. The standalone unit of claim 1 wherein the interface unit is configured to forward the energy withdrawal request or the energy storage request to the second standalone unit.

4. The standalone unit according to claim 1 wherein the standalone unit is also configured to receive the energy withdrawal request or the energy storage request from an administrative unit of the standalone power grid.

5. The standalone unit of claim 1 wherein the energy storage unit is configured to store energy in response to an energy storage request.

6. The standalone unit of claim 1 wherein the standalone unit is configured to release energy, including from the energy storage unit or from the power generation unit, in response to an energy withdrawal request submitted to the standalone power grid.

7. The standalone unit of claim 1 wherein the standalone unit is configured to receive from the standalone power grid an identification information that identifies the second standalone unit, and the interface unit is configured to communicate with the identified second standalone unit.

8. The standalone unit of claim 1 wherein the standalone unit is configured to send an identification information request to the standalone power grid.

9. The standalone power unit of claim 1 further comprising an administrative unit for communicating an energy withdrawal request or energy storage request with the standalone unit.

10. The standalone power grid of claim 9, further comprising a second standalone unit, said second standalone unit comprising:
    a power generation unit, including a photovoltaic unit, for generating power from renewable resources,
    an energy storage unit for storing energy,
    a load connection unit for connecting the second standalone unit to a load unit for the consumption of power,
    a grid unit, in particular an inverter unit, for connecting the second standalone unit to a power grid, for drawing energy from the power grid and for feeding energy into the power grid, and
    an interface unit for communicating an energy withdrawal request or an energy storage request with the standalone unit.

11. A method for controlling a standalone power unit for a standalone power grid, comprising:

communicating an energy withdrawal request or energy storage request between the standalone power unit and a second standalone unit;

receiving energy withdrawal requests from the second standalone unit at the standalone unit to draw energy from the standalone unit;

sending energy withdrawal requests from the standalone unit to the second standalone unit to draw energy from the second standalone unit;

receiving energy storage requests from the second standalone unit to the standalone unit to store energy in the standalone unit;

sending energy storage requests from the standalone unit to the second standalone unit to store energy in the second standalone unit; and forwarding energy withdrawal requests or energy storage requests from the standalone unit to the second standalone unit, wherein the energy withdrawal requests and energy storage requests are sent using direct communications from the standalone unit to only the second standalone unit in the standalone power grid without communicating with a central control unit, and wherein the second standalone unit is adapted to decide autonomously whether to handle the requests or to forward the requests to a next adjacent unit for energy balancing among adjacent standalone units within the standalone power grid.

12. The method of claim 11, comprising the step of sending an energy withdrawal request or energy storage request from an administrative unit to the standalone unit.

13. The method of claim 11 further comprising selecting the standalone unit, to which the administrative unit sends the energy withdrawal requests or energy storage requests, according to a prioritization list representing a prioritized order of the standalone unit and the second standalone unit, or according to a prediction list representing a predicted order of the standalone unit and the second standalone unit.

14. The method of claim 11 further comprising selecting the second standalone unit, with which the standalone unit communicates, according to a prioritization list representing a prioritized order of the second standalone unit and a third standalone unit, or according to a prediction list representing a predicted order of the second standalone unit and a third standalone unit.

* * * * *